United States Patent
Fang et al.

(10) Patent No.: US 8,504,056 B2
(45) Date of Patent: *Aug. 6, 2013

(54) MOBILE STATION INITIATED LOAD BALANCING IN WIRELESS COMMUNICATION NETWORKS

(75) Inventors: Yonggang Fang, San Diego, CA (US); Rajesh Bhalla, Gahanna, OH (US)

(73) Assignee: ZTE (USA) Inc., Morristown, NJ (US)

( * ) Notice: Subject to any disclaimer, the term of this patent is extended or adjusted under 35 U.S.C. 154(b) by 65 days.

This patent is subject to a terminal disclaimer.

(21) Appl. No.: 13/401,779

(22) Filed: Feb. 21, 2012

(65) Prior Publication Data

US 2012/0149376 A1    Jun. 14, 2012

Related U.S. Application Data

(63) Continuation of application No. 11/945,903, filed on Nov. 27, 2007, now Pat. No. 8,121,607.

(60) Provisional application No. 60/867,359, filed on Nov. 27, 2006.

(51) Int. Cl.
*H04H 20/71* (2008.01)
*H04W 4/00* (2009.01)
*H04W 36/00* (2009.01)
*H04W 72/00* (2009.01)

(52) U.S. Cl.
USPC .......... 455/453; 455/436; 455/450; 370/331; 370/312

(58) Field of Classification Search
USPC .......... 370/372, 312, 331–337; 455/450–453, 455/336–444
See application file for complete search history.

(56) References Cited

U.S. PATENT DOCUMENTS

| 6,728,540 B1 | 4/2004 | DeSantis et al. |
| 6,760,599 B1 | 7/2004 | Uhlik |
| 2003/0092444 A1 | 5/2003 | Sengodan et al. |
| 2003/0193917 A1 | 10/2003 | Song et al. |
| 2009/0156215 A1 | 6/2009 | Pitkamaki |

FOREIGN PATENT DOCUMENTS

WO    2006/048697 A1    5/2006

OTHER PUBLICATIONS

Dutta, A., et al., "Seamless proactive handover across heterogeneous access networks," Wireless Personal Communications, 43(3):837-855, Nov. 2007.

*Primary Examiner* — Nizar Sivji
(74) *Attorney, Agent, or Firm* — Perkins Coie LLP

(57) ABSTRACT

Techniques for load balancing across different access networks based on procedures initiated by a wireless terminal or mobile station and examples of using load balancing within the same access network to hand off a mobile station from one base station to another based on procedures initiated by the mobile station.

22 Claims, 4 Drawing Sheets

FIG. 4

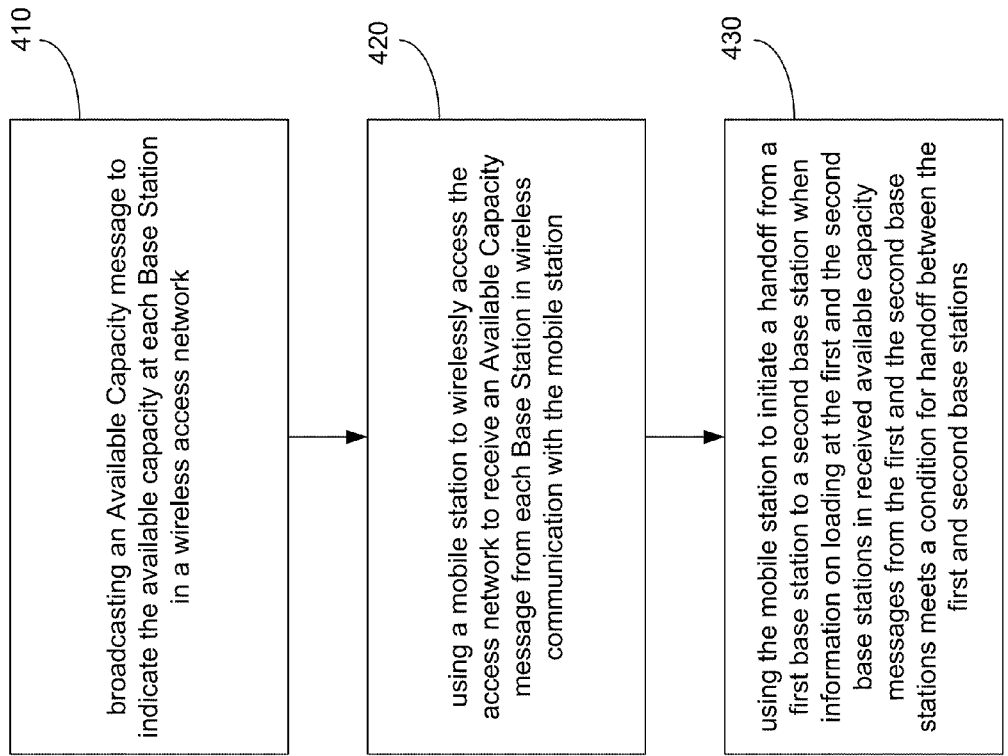

410: broadcasting an Available Capacity message to indicate the available capacity at each Base Station in a wireless access network 420: using a mobile station to wirelessly access the access network to receive an Available Capacity message from each Base Station in wireless communication with the mobile station 430: using the mobile station to initiate a handoff from a first base station to a second base station when information on loading at the first and the second base stations in received available capacity messages from the first and the second base stations meets a condition for handoff between the first and second base stations

MOBILE STATION INITIATED LOAD BALANCING IN WIRELESS COMMUNICATION NETWORKS

PRIORITY CLAIM AND RELATED PATENT APPLICATION

This application is a continuation of U.S. patent application Ser. No. 11/945,903, filed Nov. 27, 2007, which claims the benefit of U.S. Provisional Application Ser. No. 60/867,359, entitled "Mobile Station Initiated Load Balancing In Wireless Communication Networks", filed Nov. 27, 2006. The entire contents of the before-mentioned patent applications are incorporated by reference as part of the disclosure of this application.

TECHNICAL FIELD

This application relates to wireless communications, including but not limited to wireless communications networks based on Radio Transmission Technologies (RTT) being developed by 3GPP/3GPP2 organizations and the wireless technologies being developed by the IEEE Standards Association.

BACKGROUND

A wireless communication network covers a certain geographic area by dividing the area into radio cells and each radio cell can be further divided into two or more sectors. The base stations, which conceptually locate at the center of respective cells/sectors of their coverage, transmit information to the mobile subscriber stations (MSS) via downlink (DL) radio signals. A mobile station is also known as a mobile station (MS), a subscriber station (SS), or a wireless station. The mobile stations transmit information to their serving base stations via uplink (UL) radio signals. A wireless communication network can be configured based on one of the number of wireless technology platforms such as IS-95, CDMA2000 1x, EV-DO, UMB, GSM, WCDMA, HSPA (High-Speed Packet Access), LTE, WiMAX and WiFi wireless networks.

Two or more different-technology wireless communication networks may overlay with each other or may be deployed in adjacent geographic locations to provide access to mobile stations. Such heterogeneous access technology overlay and complementary network deployments are likely to proliferate. Mobile stations can be configured as multi-technology, multi-mode terminals and operate to provide access amongst multiple wireless networks. One technical issue in such inter-network access is load balancing across heterogeneous access networks.

SUMMARY

This application provides techniques for load balancing initiated by a wireless terminal or mobile station in wireless communications.

In one aspect, a method for providing load balancing across heterogeneous-access networks in wireless communication includes periodically broadcasting from each network of at least two heterogeneous-access networks based on different wireless access technologies an Available Capacity message to indicate available capacity at each Base Station; using a mobile station to wirelessly access the heterogeneous-access networks to receive an Available Capacity message from each Base Station in wireless communication with the mobile station; and using the mobile station to initiate a handoff from a first base station in a first access network to a second base station in a second, different access network when information on loading at the first and the second base stations in received available capacity messages from the first and the second base stations meets a condition for inter-network handoff between the first and second access networks.

In another aspect, a method for providing load balancing across homogeneous-access networks in wireless communication includes periodically broadcasting from each network of at least two different wireless access networks operated by two different operators and based on a common wireless access technology an Available Capacity message to indicate the available capacity at each Base Station; using a mobile station to wirelessly access the access networks to receive an Available Capacity message from each Base Station in wireless communication with the mobile station; and using the mobile station to initiate a handoff from a first base station in a first access network to a second base station in a second, different access network when information on loading at the first and the second base stations in received available capacity messages from the first and the second base stations meets a condition for inter-network handoff between the first and second access networks.

In another aspect, a method for providing handoff within a wireless access network in wireless communication includes broadcasting an Available Capacity message to indicate the available capacity at each Base Station in a wireless access network; using a mobile station to wirelessly access the access network to receive an Available Capacity message from each Base Station in wireless communication with the mobile station; and using the mobile station to initiate a handoff from a first base station to a second base station when information on loading at the first and the second base stations in received available capacity messages from the first and the second base stations meets a condition for handoff between the first and second base stations.

In yet another aspect, a wireless communication system includes a first wireless access network of base stations each wirelessly broadcasting an Available Capacity message to indicate available capacity at each base station; a second wireless access network of base stations based on a wireless technology different from the first wireless access network, the second wireless network wirelessly broadcasting from each base station an Available Capacity message to indicate available capacity at each base station; means in a mobile station for wirelessly accessing the access networks to receive an Available Capacity message from each base station in wireless communication with the mobile station; means in the mobile station for initiating a handoff from a first base station in the first access network to a second base station in the second access network when information on loading at the first and the second base stations in received available capacity messages from the first and the second base stations meets a condition for inter-network handoff between the first and second access networks; and means in the mobile station for initiating a handoff from a base station in the first access network to a different base station in the first access network when information on loading at the base station and the different base station in the first access network in received available capacity messages from the base station and the different base station meets a condition for intra-network handoff in the first access network.

Examples and implementations of these and other aspects are described in greater detail in the drawings, the description and the claims.

BRIEF DESCRIPTION OF DRAWINGS

FIG. 4 shows an example for providing handoff within a wireless access network in wireless communication based on load balancing.

DETAILED DESCRIPTION

This application describes examples of load balancing across different access networks based on procedures initiated by a wireless terminal or mobile station and examples of using load balancing within the same access network to hand off a mobile station from one base station to another based on procedures initiated by a mobile station. Two different access networks in connection with the mobile or terminal initiated load balancing can be heterogeneous based on different wireless access technologies or homogenous based on the same wireless access technologies.

Load balancing in homogenous-access wireless communication networks refers to balancing the usage of the wireless links of access networks based on the same wireless access technology. Such load balancing can be managed in a central control mode by using network entities, such as the Base Station (BS), Base Station Controller (BSC), Access Service Network (ASN) Gateway (GW) etc. The techniques described in this application provide different ways of load balancing in homogenous-access wireless communication networks based on mobile station-initiated load balancing procedures. Load balancing in heterogeneous-access networks refers to balancing the usage of the wireless links of multi-technology access networks that are based on different wireless access technologies. Various wireless systems with heterogeneous access multi-technology networks do not have a central control network entity that provides network-side capabilities for load balancing. The techniques described in this application provide mechanisms in such systems to use multi-mode terminals or mobile stations to initiate load balancing between different wireless access networks. Certain implementations of such MS-initiated load balancing can be used to achieve one or more features, such as simplifying the network architecture towards a decentralized or flat network architecture, optimizing the utilization of wireless networks, and providing optimal network performance for different applications.

Figure 1:
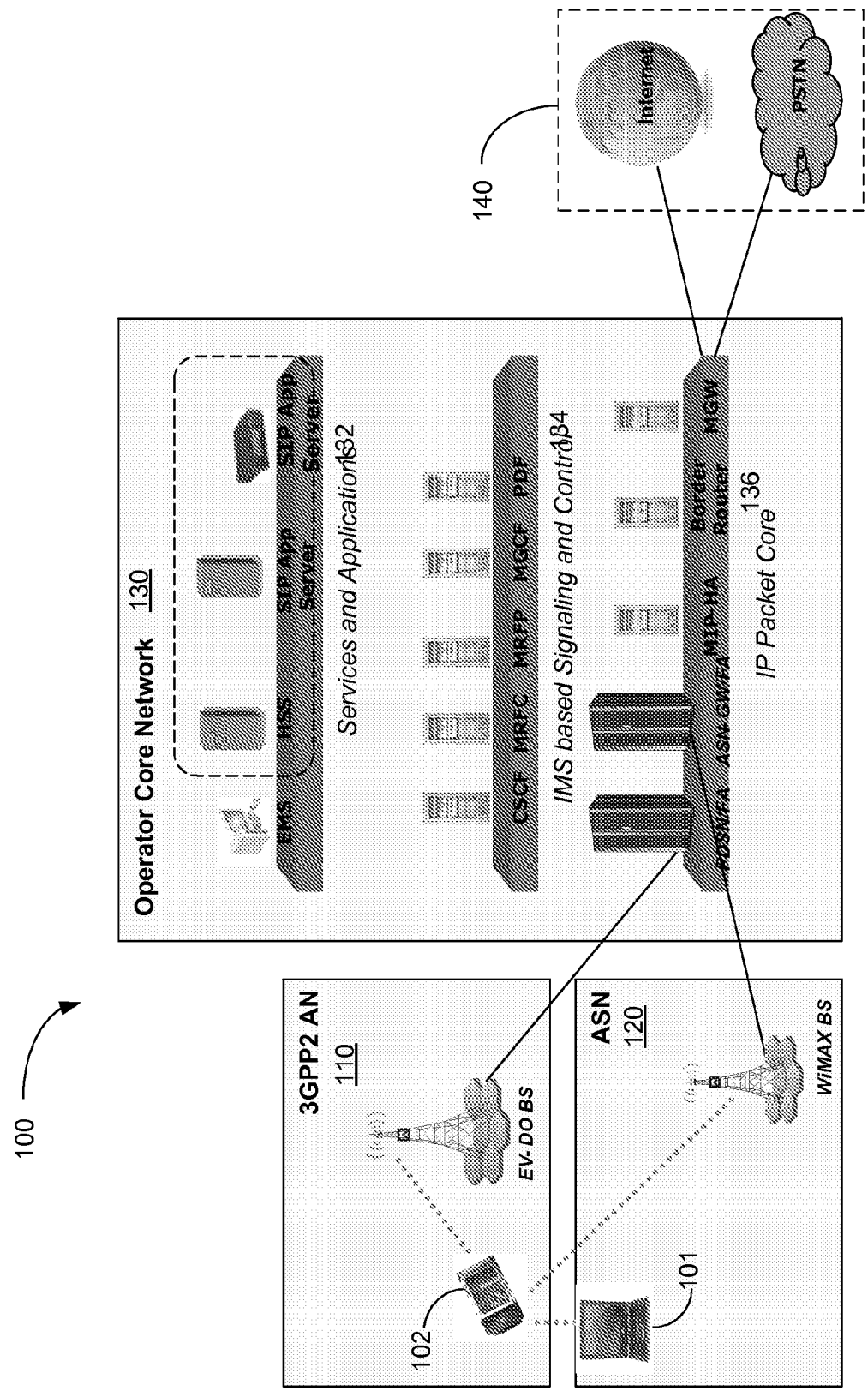
FIG. 1 shows an example of a wireless communication system with two heterogeneous access networks and a core network to support mobile station-initiated load balancing.

FIG. 1 shows an example of a wireless communication system in a heterogeneous access network environment where the present MS-initiated load balancing can be implemented. In this example, the wireless communication system 100 includes a 3GPP2 access network 110 such as an EV-DO network, an ASN 120 such as a WiMax network, and a core network 130 with various network functions. The core network 130 is connected to one or more other networks 140 such as the Internet and PSTN (public switched telephone network).

The example in FIG. 1 and other network structures for an interworking architecture can be configured to support a decentralized (Semi-Flat) architecture, permit decoupling of access networks (e.g., 110 and 120) from IP connectivity services, and allow different access networks (e.g., 110 and 120) to interwork through a common Core network (e.g., 130). In the example in FIG. 1, common Billing and customer care can be implemented to provide one bill for both WiMAX usage in the ASN 120 and EV-DO usage in the 3GPP2 network 110, and unified authentication, authorization and accounting operations. The AAA can be handled by the Core network platform 130. A wireless terminal or a mobile station, such as a mobile phone or a computer 101 with a wireless network access card 102, can wirelessly access both networks 110 and 120 to obtain wireless services for either or both of telephone and various data (e.g., multimedia and TV broadcasts) services via the networks 140. Based on the techniques and network designs described in this application, a wireless terminal or mobile station can monitor the load capacity of base stations to perform load balancing across different access networks such as two heterogeneous networks 110 and 120 in FIG. 1 or two different access networks based on the same technology and operated by different operators. In addition, the wireless terminal or mobile station can also monitor the load capacity of base stations within the same access network (e.g., 110 or 120) to perform mobile handoff from one base station to another base station based on load balancing.

The common Core Network 130 can be configured to enable an operator to maintain one IP Core 136 such as AAA, MIP HA, DHCP server, provisioning and charging elements for the different access technologies (e.g., WiMAX 120 and EV-DO 110 in FIG. 1). The common core network 130 can also be configured to allow subscribers to access all services and applications in Core network 130 through either WiMAX 120 or EV-DO 110 or both networks 110 and 120. As such, the core network 130 is common to the different access networks 110 and 120 and provide a bridge between the networks 140 and the access networks 110 and 120.

The example in FIG. 1 can be used to provide seamless session continuity by using dual mode MSs to roam between different access networks 110 and 120 while maintaining IP session continuity and by using Mobile IP based solutions for inter-technology handoffs. Two exemplary access networks 110 and 120 are illustrated in FIG. 1 to provide heterogeneous access: (1) a network 120 of WiMAX BSs to provide WiMAX air link to the MS and connection to the Core Network 130 through ASN Gateway in the Core Network 130, and (2) a network 110 of EV-DO BSs to form an AN which provides EV-DO air link to the MS and connection to the Core Network 130 through the PDSN 140 also in the Core Network 130. The session continuity and mobility can be supported through a foreign agent (FA) and a home agent (HA).

An interworking terminal is used to access both the WiMAX 120 and EV-DO 110 and can be a multi-mode terminal which provides either WiMAX or EV-DO air link connection at a given time or both air link connections at the same time. In one implementation, a unique Network Access ID (NAI) can be assigned to each multi-mode terminal to identify the terminal.

The Core Service Network 130 in FIG. 1 can include an IP Core module 136 which can be configured to include various functions, for example, PDSN, ASN Gateway, and Mobile IP (MIP) HA which is the anchor point for interworked MIP mobility. The core service network 130 can also include signaling and control functions 134: (1) MRFC (Media Resource Function Control) for multi-media services and controls of dynamic resource allocations in the MRFP, (2) MRFP (Media Resource Function Processor) which provides resources needed for multi-media processing, (3) MGW (Media Gateway) which provides adaptive functions among the different media flows, viz. different codec conversions, transport format conversions between the packet network and the circuit network, (4) MGCF (Media Gateway Control Function) for multi-media services to control resource allocation in the MGW, (5) PDF (Policy Decision Function) which provides Policy info/decisions to the AAA, and (6) CSCF (Call Session control Function) as a control module in the IMS network and used for multi-media services. The CSCF can act as Proxy-CSCF, Interrogating-CSCF and Serving-CSCF.

The Core Service Network 130 in FIG. 1 can include supporting systems 132 such as Home Subscriber Server (HSS), Billing Support System, and Operational Support System (OSS). These supporting systems 132 provide unified authentication, authorization and accounting services for IP packet data services and multi-media services for both WiMAX and EV-DO users. In addition, the Core Service Network 130 in FIG. 1 can include various applications and services, such as Content Services, and Session Initiation Protocol (SIP) based Application Services.

The MS-initiated loading balancing can be implemented in the system 100 in FIG. 1 and other heterogeneous access networks to provide a generic load balancing solution for heterogeneous access-technology networks. This MS-initiated loading balancing can also be usable for load balancing for intra access-technology networks. The specific example in FIG. 1 uses the MS-initiated loading balancing to provide load balancing between WiMAX and EV-DO co-located networks 120 and 110.

In FIG. 1, the WiMAX 120 and EV-DO 110 are deployed in different frequency bands. Each of the WiMAX and EV-DO Base Stations broadcasts its Available Capacity (AC) information periodically. Such AC information is broadcast via an Available Capacity signaling message independently by each WiMAX and EV-DO Base Station. A WiMAX and EV-DO dual mode terminal is configured to access both WiMAX and EV-DO air links, and monitors the Available Capacity messages broadcast from Multiple BSs of the WiMAX network 120 and Multiple BSs of the EV-DO network 110. The dual mode terminal can calculate the network load information from Available Capacity message and other system information in pre-configured parameters or broadcast messages. Each dual mode terminal initiates intra-technology or inter-technology switch-over based on the received loading information in one or more received AC messages.

Certain implementations of this MS-initiated load balancing based on the MS-monitored AC messages can be used to achieve one or more advantages. For example, this MS-initiated load balancing can be used to provide a generic approach to load balancing between heterogeneous-technology and homogeneous-technology access networks. For another example, this MS-initiated load balancing can be used to support decoupling of different access networks. For another example, this MS-initiated load balancing can be used to reduce complexity of network architecture and easy to integrate into pure flat network architectures of the future. As a further example, this MS-initiated load balancing can be used to provide load balancing (Switch-Over) procedures that are same or similar to normal handoffs in part because the load balancing is initiated at the MS side.

In one implementation of the MS-initiated load balancing, the Available Capacity Message can be used for reporting the load in different access networks (e.g., the WiMAX network 120 and EV-DO network 110 in FIG. 1) and for triggering the switching of the access networks based on the information in the AC message. The MS switches from one access network to the other access network to balance the air link load amongst the access networks.

The broadcasting of the Available Capacity message can be minimized to reduce the air link capacity requirements, where the AC message overhead can be optimized based on the frequency of the AC message. The broadcasting period of the Available Capacity message, for example, can be a configurable System Parameter, and can be manually configured to a selected value. The broadcasting period can also be dynamically controlled by the BS based on network loading conditions. If one or more loading conditions approach system defined limits, the broadcast period can be reduced in order to speed up MS to trigger load balancing.

In using the Available Capacity message, several parameters in the Available Capacity message can be used. The AC Message size can be optimized for over-the-air (OTA) transmissions. Certain implementations of the Available Capacity message can be defined to include several parameters including the ones as below:

a. Available Capacity (AC) Type: which indicates AC to be for the current moment or for the potential period (frames) starting from the current time.
    b. Available Capacity Percentage: which can be the AC on the downlink (DL) and the uplink (UL) in terms of the unused airlink capacity. For example,
        i. DL AC: 3 or 4 bits representing available DL percentage capacity;
        ii. UL AC: 3 or 4 bits representing available UL percentage capacity.
    c. Switch-Over Thresholds: which can be set for the load balancing operations.
        i. First, a Switch-In CINR (carrier-to-interference plus noise ratio)/Modulation Rate threshold can be set to be a configurable parameter. The MS can be switched-in to the network if MS measured CINR for that network is higher than this AC message value.
        ii. Second, a Switch-Out CINR/Modulation Rate threshold can be set to be a configurable parameter. The MS can be switched out of the network if MS measured CINR for that network is lower than this AC value.

Two MS-initiated load balancing implementation schemes are described below as examples. In one implementation, a Single-Connection (SC) load balancing uses MS to monitor multiple air links in the interworking region simultaneously in order to reduce handoff latency and improve the handoff success rate. In this scheme, the MS sets up only one L3 connection to the Core Network from the best air link connection. In another implementation called Multi-Connection (MC) load balancing, a MS monitors and acquires multiple L2 connections of air links simultaneously and MS sets up multiple L3 connections to the Core Network from all the available air links.

As a specific example, the SC Load Balancing can be implemented in the following manner. Each MS has independent air link modules, such as WiMAX and EV-DO modules. Each MS is configured to comply with existing MIPv4 and MIPv6 protocols. The MS has unique NAI and is assigned a unique HoA from the HA. MS's care of address (CoA) and home address (HoA) are bound at the HA. In operation, for example, a MS connecting to one access network moves to multiple-network coverage where the MS monitors new available air links while maintaining the existing connection. MS checks the Available Capacity messages from multiple air link connections. If MS detects the loading of current network reaches a given threshold or it reaches Switch-Out threshold, MS initiates Switch-Over procedure to the other network via normal L2 handoff if there is some capacity available in neighbor cells of current-technology network or other-technology networks, and Switch-In requirement from the neighbor cell or other network are met. The MS maintains IP session continuity through MIP-HA. The MS and MIP-HA keeps IP layer seamless for applications.

The Available Capacity control algorithm for the MS-initiated load balancing can reside in different network nodes, e.g., a BSC for EV-DO network and a BS for WiMAX. The Available Capacity control algorithm can, for example, use the existing CDMA loading control mechanism or a new algorithm to determine the loading conditions. In operation, the Available Capacity control algorithm on each network controls the network loading via adjusting (1) Available Capacity percentages and (2) Switch-Over thresholds.

Hence, the MS-initiated load balancing is initiated by a MS to simplify the implementation of the load balancing in heterogeneous-access or homogeneous-access networks. Each BS broadcasts its loading and switching control information and a MS autonomously switches-in or switches-out of the network to balance the network loading according to the Available Capacity information and application QoS requirements. A BS controls its loading via adjusting parameters in the AC message.

Figure 2:
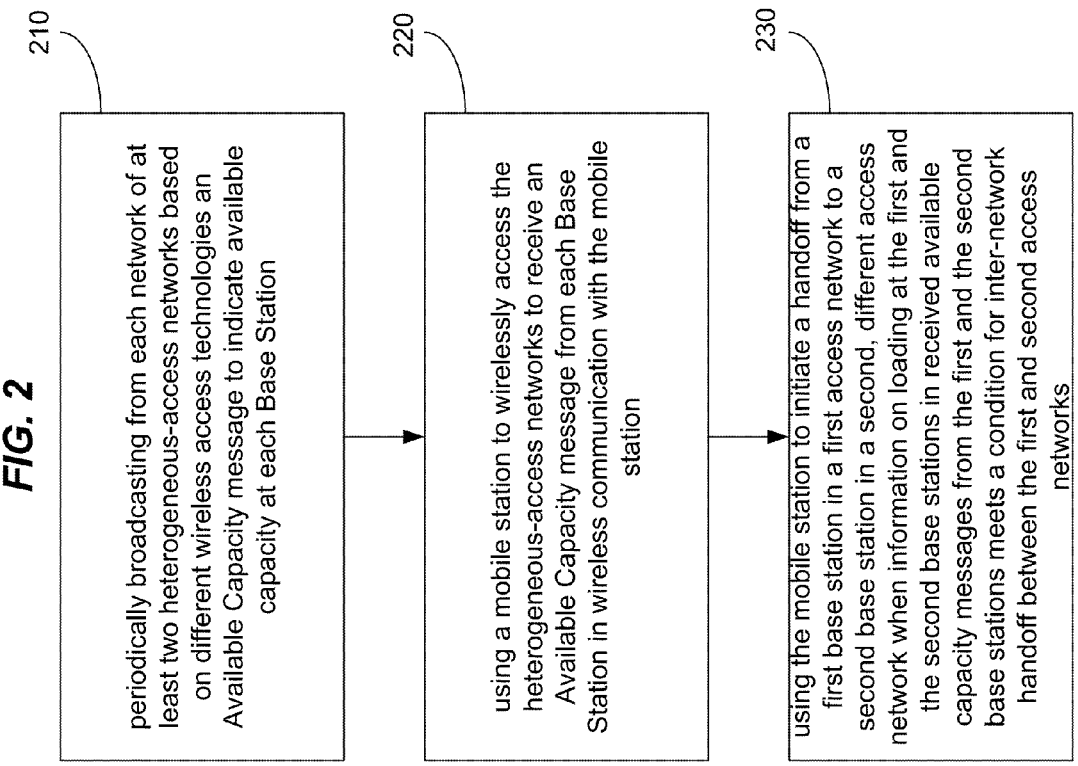
FIG. 2 shows an example for providing load balancing across heterogeneous-access networks in wireless communication.

FIG. 2 illustrates a method for providing load balancing across heterogeneous-access networks in wireless communication. Step 210 provides periodically broadcasting from each network of at least two heterogeneous-access networks based on different wireless access technologies an Available Capacity message to indicate available capacity at each Base Station. Step 220 provides using a mobile station to wirelessly access the heterogeneous-access networks to receive an Available Capacity message from each Base Station in wireless communication with the mobile station. Step 230 provides using the mobile station to initiate a handoff from a first base station in a first access network to a second base station in a second, different access network when information on loading at the first and the second base stations in received available capacity messages from the first and the second base stations meets a condition for inter-network handoff between the first and second access networks.

The above load balancing in heterogeneous-access networks can also be applied to load balancing in homogenous-access wireless communication networks that are operated by different network operators and are based on the same wireless access technology. Such different homogenous-access wireless communication networks share the same core network (e.g., 130 in FIG. 1) in communications with other networks 140 (e.g., the Internet and PSTN).

Figure 3:
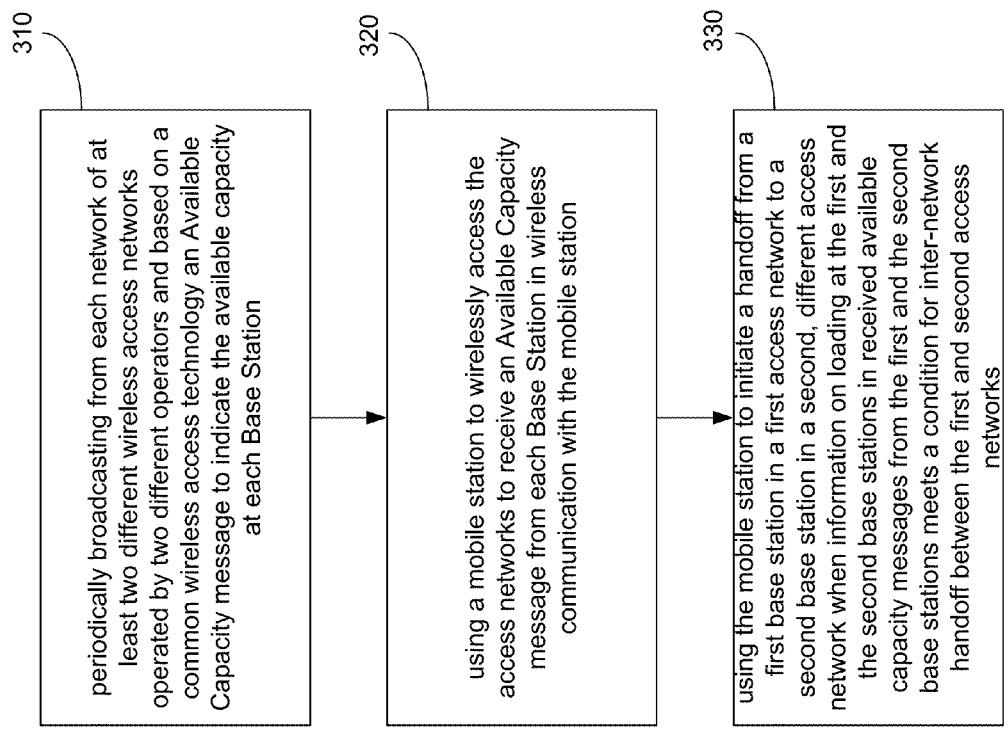
FIG. 3 shows an example for providing load balancing across homogeneous-access networks in wireless communication.

FIG. 3 shows an example of a method for providing load balancing across homogeneous-access networks in wireless communication. Step 310 provides periodically broadcasting from each network of at least two different wireless access networks operated by two different operators and based on a common wireless access technology an Available Capacity message to indicate the available capacity at each Base Station. Step 320 provides using a mobile station to wirelessly access the access networks to receive an Available Capacity message from each Base Station in wireless communication with the mobile station. Step 330 provides using the mobile station to initiate a handoff from a first base station in a first access network to a second base station in a second, different access network when information on loading at the first and the second base stations in received available capacity messages from the first and the second base stations meets a condition for inter-network handoff between the first and second access networks.

In addition, the above load balancing in heterogeneous-access networks can also be applied to handoff between different base stations within an access network, e.g., the network 110 or 120 in the system 100 in FIG. 1. Many handoff procedures use wireless communication signal strengths between a mobile and base stations to control the handoff process. The present handoff technique within an access network operates a mobile station to monitor the load capacities at different base stations in communications with the mobile station and use the load balancing alone or in combination with other parameters to control the handoff process. Such an intra-technology network load balancing procedure can be implemented in a way similarly to a MS initiated handoff within an access network. In such an intra-technology network load balancing, the AC message provides the triggering information for initiating the load balancing. The inter-technology network load balancing procedure can be similar to network re-selection in the inter-network handoffs.

FIG. 4 shows an example of a method for providing handoff within a wireless access network in wireless communication. Step 410 provides broadcasting an Available Capacity message to indicate the available capacity at each Base Station in a wireless access network. Step 420 provides using a mobile station to wirelessly access the access network to receive an Available Capacity message from each Base Station in wireless communication with the mobile station. Step 430 provides using the mobile station to initiate a handoff from a first base station to a second base station when information on loading at the first and the second base stations in received available capacity messages from the first and the second base stations meets a condition for handoff between the first and second base stations.

While this specification contains many specifics, these should not be construed as limitations on the scope of any invention or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Thus, particular embodiments have been described. Other embodiments are within the scope of the following claims.

What is claimed is:

1. A method for providing load balancing across heterogeneous-access networks in wireless communication, comprising:

periodically broadcasting from each network of at least two heterogeneous-access networks based on different wireless access technologies an Available Capacity message to indicate available capacity at each Base Station;

using a mobile station to wirelessly access the heterogeneous-access networks to receive an Available Capacity message from each Base Station in wireless communication with the mobile station;

using the mobile station to initiate a handoff from a first base station in a first access network to a second base station in a second, different access network when information on loading at the first and the second base stations in received available capacity messages from the first and the second base stations meets a condition for inter-network handoff between the first and second access networks;

using the mobile station to initiate a handoff from a first base station in a first access network to a different base station in the first access network when information on loading at the first base station and the different base station in the first access network in received available capacity messages from the first base station and the different base station meets a condition for intra-network handoff in the first access network; and operating the mobile station to simultaneously monitor two or more layer 2 (L2) air links with different base stations in the first access network to acquire Available Capacity messages from the different base stations to reduce handoff latency and to establish a single layer 3 (L3) connection to a core network via a best air link selected from the monitored air links.

2. A system for providing load balancing across heterogeneous-access networks in wireless communication, comprising:

a plurality of base stations that periodically broadcast, from each network of at least two heterogeneous-access networks based on different wireless access technologies, an Available Capacity message to indicate available capacity at each base station;

a mobile station to wirelessly access the heterogeneous-access networks to receive an Available Capacity message from each Base Station in wireless communication with the mobile station;

the mobile station configured to initiate a handoff from a first base station in a first access network to a second base station in a second, different access network when information on loading at the first and the second base stations in received available capacity messages from the first and the second base stations meets a condition for inter-network handoff between the first and second access networks;

the mobile station, further to initiate a handoff from the first base station in the first access network to a different base station in the first access network when information on loading at the first base station and the different base station in the first access network in received available capacity messages from the first base station and the different base station meets a condition for intra-network handoff in the first access network; and the mobile station operable to simultaneously monitor two or more layer 2 (L2) air links with different base stations in the first access network to acquire Available Capacity messages from the different base stations to reduce handoff latency and to establish a single layer 3 (L3) connection to a core network via a best air link selected from the monitored air links.

3. The system of claim 2, wherein the first access network comprises a WiMAX network.

4. The system of claim 2, wherein the first access network comprises an EV-DO network.

5. The system of claim 2, wherein the Available Capacity messages from the different base stations include a type parameter, a percentage parameter and switch-over threshold parameters.

6. A system for providing load balancing across heterogeneous-access networks in wireless communication, comprising:

a plurality of base stations that periodically broadcast, from each network of at least two heterogeneous-access networks based on different wireless access technologies, an Available Capacity message to indicate available capacity at each base station;

a mobile station to wirelessly access the heterogeneous-access networks to receive an Available Capacity message from each Base Station in wireless communication with the mobile station;

the mobile station configured to initiate a handoff from a first base station in a first access network to a second base station in a second, different access network when information on loading at the first and the second base stations in received available capacity messages from the first and the second base stations meets a condition for inter-network handoff between the first and second access networks;

the mobile station, further to initiate a handoff from the first base station in the first access network to a different base station in the first access network when information on loading at the first base station and the different base station in the first access network in received available capacity messages from the first base station and the different base station meets a condition for intra-network handoff in the first access network; and the mobile station operable to simultaneously monitor two or more layer 2 (L2) air links with different base stations in the first access network to acquire Available Capacity messages from the different base stations to reduce handoff latency and to establish two or more layer 3 (L3) connections to a core network via a best air link selected from the monitored air links.

7. The system of claim 6, wherein the first access network comprises a WiMAX network.

8. The system of claim 6, wherein the first access network comprises an EV-DO network.

9. The system of claim 6, wherein the Available Capacity messages from the different base stations include a type parameter, a percentage parameter and switch-over threshold parameters.

10. A system for providing load balancing across homogeneous-access networks in wireless communication, comprising:

at least two different wireless access networks operated by two different operators that periodically broadcast, based on a common wireless access technology, an Available Capacity message to indicate the available capacity at each Base Station;

a mobile station to wirelessly access the access networks to receive an Available Capacity message from each Base Station in wireless communication with the mobile station;

the mobile station further configured to initiate a handoff from a first base station in a first access network to a second base station in a second, different access network when the mobile station determines that information on loading at the first and the second base stations in received available capacity messages from the first and the second base stations meets a condition for inter-network handoff between the first and second access networks;

the mobile station further configured to initiate a handoff from a first base station in a first access network to a different base station in the first access network when information on loading at the first base station and the different base station in the first access network in received available capacity messages from the first base station and the different base station meets a condition for intra-network handoff in the first access network; and the mobile station operable to simultaneously monitor two or more layer 2 (L2) air links with different base stations in the first access network to acquire Available Capacity messages from the different base stations to reduce handoff latency and to establish a single layer 3 (L3) connection to a core network via a best air link selected from the monitored air links.

11. The system of claim 10, wherein the first access network comprises a WiMAX network.

12. The system of claim 10, wherein the first access network comprises an EV-DO network.

13. The system of claim 10, wherein the Available Capacity messages from the different base stations include a type parameter, a percentage parameter and switch-over threshold parameters.

14. A system for providing load balancing across homogeneous-access networks in wireless communication, comprising:
　at least two different wireless access networks operated by two different operators that periodically broadcast, based on a common wireless access technology, an Available Capacity message to indicate the available capacity at each Base Station;
　a mobile station to wirelessly access the access networks to receive an Available Capacity message from each Base Station in wireless communication with the mobile station;
　the mobile station further configured to initiate a handoff from a first base station in a first access network to a second base station in a second, different access network when the mobile station determines that information on loading at the first and the second base stations in received available capacity messages from the first and the second base stations meets a condition for inter-network handoff between the first and second access networks;
　the mobile station further configured to initiate a handoff from a first base station in a first access network to a different base station in the first access network when information on loading at the first base station and the different base station in the first access network in received available capacity messages from the first base station and the different base station meets a condition for intra-network handoff in the first access network; and
　the mobile station operable to simultaneously monitor two or more layer 2 (L2) air links with different base stations in the first access network to acquire Available Capacity messages from the different base stations to reduce handoff latency and to establish two or more layer 3 (L3) connections to a core network via a best air link selected from the monitored air links.

15. The system of claim 14, wherein the period of said broadcasting is dynamically controlled by a Base Station.

16. The system of claim 15, further comprising:
　reducing the broadcasting period when one or more loading conditions approach system defined limits.

17. A system for providing handoff within a wireless access network in wireless communication, comprising:
　a wireless access network including a plurality of base stations, each base station configured to broadcast an Available Capacity message to indicate the available capacity at that base station;
　a mobile station configured to wirelessly access the access network to receive an Available Capacity message from each Base Station in wireless communication with the mobile station;
　the mobile station further configured to initiate, a handoff from a first base station to a second base station when the mobile station determines that information on loading at the first and the second base stations in received available capacity messages from the first and the second base stations meets a condition for handoff between the first and second base stations; and
　the mobile station further operable to simultaneously monitor two or more layer 2 (L2) air links with different base stations in the first access network to acquire Available Capacity messages from the different base stations to reduce handoff latency and to establish a single layer 3 (L3) connection to a core network via a best air link selected from the monitored air links.

18. The system of claim 17, wherein the period of said broadcasting is dynamically controlled by a Base Station.

19. The system of claim 18, further comprising:
　reducing the broadcasting period when one or more loading conditions approach system defined limits.

20. A system for providing handoff within a wireless access network in wireless communication, comprising:
　a wireless access network including a plurality of base stations, each base station configured to broadcast an Available Capacity message to indicate the available capacity at that base station;
　a mobile station configured to wirelessly access the access network to receive an Available Capacity message from each Base Station in wireless communication with the mobile station;
　the mobile station further configured to initiate, a handoff from a first base station to a second base station when the mobile station determines that information on loading at the first and the second base stations in received available capacity messages from the first and the second base stations meets a condition for handoff between the first and second base stations; and
　the mobile station further operable to simultaneously monitor two or more layer 2 (L2) air links with different base stations in the first access network to acquire Available Capacity messages from the different base stations to reduce handoff latency and to establish two or more layer 3 (L3) connections to a core network via a best air link selected from the monitored air links.

21. The system of claim 20, wherein the period of said broadcasting is dynamically controlled by a Base Station.

22. The system of claim 21, further comprising:
　reducing the broadcasting period when one or more loading conditions approach system defined limits.

\* \* \* \* \*